United States Patent
Leinhart et al.

(10) Patent No.: US 6,597,859 B1
(45) Date of Patent: Jul. 22, 2003

(54) METHOD AND APPARATUS FOR ABSTRACTING VIDEO DATA

(75) Inventors: Rainer W. Leinhart, Santa Clara, CA (US); Boon-Lock Yeo, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/465,988

(22) Filed: Dec. 16, 1999

(51) Int. Cl.[7] .................................................. H04N 5/91
(52) U.S. Cl. ............................................ 386/65; 386/95
(58) Field of Search ........................ 386/46, 65, 96, 386/95; 375/240.15; 348/700, 701; H04N 5/91, 9/79, 5/76; G11B 27/034

(56) References Cited

U.S. PATENT DOCUMENTS

| | | | |
|---|---|---|---|
| 4,920,423 A | * | 4/1990 | Shiota .......................... 386/46 |
| 5,485,553 A | * | 1/1996 | Kovalick et al. ............. 386/96 |
| 5,642,174 A | * | 6/1997 | Kazui et al. ................. 348/700 |
| 6,347,114 B1 | * | 2/2002 | Blanchard .................... 375/240 |

FOREIGN PATENT DOCUMENTS

| | | | | |
|---|---|---|---|---|
| GB | 2332976 | * | 7/1999 | ......... G11B/27/034 |
| WO | WO94/11995 | * | 5/1994 | ............ H04N/9/79 |

* cited by examiner

*Primary Examiner*—Vincent Boccio
(74) *Attorney, Agent, or Firm*—Blakely, Sokoloff, Taylor & Zafman LLP (57) ABSTRACT

A method of generating an abstract of video data. In one embodiment, the method comprises extracting timestamps from the video data. The timestamps identify a time when separate sections of the video data were recorded. The method further includes selecting one or more sections of the video data to generate the abstract, with the one or more sections of the video data selected based on the timestamps.

39 Claims, 7 Drawing Sheets

Figure 7

METHOD AND APPARATUS FOR ABSTRACTING VIDEO DATA

FIELD OF THE INVENTION

The present invention relates to the field of multimedia information editing. In particular the present invention discloses a method for abstracting multimedia information.

BACKGROUND OF THE INVENTION

Recording home videos with camcorders is much more popular than watching home recorded videos. One reason for this disparity is that unedited home video footage is usually long-winded, lacks visually appealing effects, and thus tends to be too time-consuming and boring to watch.

Manually editing home videos is the only way to make home videos more interesting to watch. However, video editing is difficult, time-consuming, and tedious task. Furthermore, the resulting video is inflexible and cannot adjust to the viewers' needs. Instead, these needs must be anticipated during the creation of the edited video. For example, let us suppose that some friends visit you. Spontaneously you decide to show your guests video excerpts of your last vacation. To avoid boring your guests, you want to limit the amount of video viewing to 15 minutes. You could just show the guests a randomly selected fifteen-minute segment. However, this short little segment would not provide a good summary of the vacation. One could attempt to spend fifteen minutes viewing selected random segments by using fast-forward to select segments to view. By doing this, the actual viewing time would be reduced by the amount of time spent fast-forwarding.

One could have a pre-edited fifteen-minute segment. However, creating such an edited segment is a difficult, time-consuming, tedious task as noted earlier. Furthermore, if the guests appreciated the fifteen-minute version and asked for more, one would need longer edited versions to show or resort to showing the raw video. In contrast, if the guests are your parents, you want to show them a much longer video of your vacation. Thus, it would be desirable to have system for automatically editing video down to an arbitrarily specified length.

SUMMARY OF THE INVENTION

According to one embodiment, a method is provided for generating an abstract of video data. In one embodiment, the method comprises extracting timestamps from the video data. The timestamps identify a time when separate sections of the video data were recorded. The method further includes selecting one or more sections of the video data to generate the abstract, with the one or more sections of the video data selected based on the timestamps.

DETAILED DESCRIPTION

A method and apparatus for abstracting multimedia information is disclosed. In the following description, for purposes of explanation, specific details are set forth to provide a thorough understanding of the present invention. However, it will be apparent to one skilled in the art that these specific details are not required in order to practice the present invention. For example, the present invention is described with reference to abstraction of home video information. However, the same techniques can easily be applied to other types of multimedia information such as purely audio information.

NOTATION AND NOMENCLATURE

In the following description, specific nomenclature is set forth to provide a thorough understanding. However, other terms may be used for the similar features in other references.

For purposes of this document, three specific terms are defined. The term "video" is used to describe material that comprises motion pictures and sound. Furthermore, the term "video abstract" denotes a shortened video consisting of motion pictures and sound. Finally, the term "abstraction ratio" designates the ratio between the duration of the source video material and the duration of the video abstract. The higher the abstraction ratio, the greater is the required shortening of the source video material.

Multimedia Abstracting Overview

Prior Work

There are at least four existing systems designed to reduce source videos into video abstracts. Each existing system is set forth below.

The first system is known as "video skimming." The video skimming system is disclosed in the paper "Video Skimming for Quick Browsing Based on Audio and Image Characterization" by M. Smith and T. Kanade in the Computer Science Technical Report, Carnegie Mellon University, July 1995. The video skimming system is aimed mainly at abstracting documentaries and newscasts. Video skimming requires that a transcript of the audio track be available. The video and the audio track transcript are then aligned by word spotting. The audio track of the video skim is constructed by using language analysis (such as the *Term Frequency Inverse Document Frequency* measure) to identify important words in the transcript; audio clips around those words are then cut out. Based on detected faces, text, and camera operations, video clips for the video skim are selected from the surrounding frames.

The second system, called V Abstract (Silvia Pfeiffer, Rainer Lienhart, Stephan Fischer and Wolfgang Effelsberg, Abstracting Digital Movies Automatically, *Journal of Visual Communication and Image Representation*, Vol. 7, No. 4, pp.345–353, December 1996.), is the predecessor of the third system, called MoCA Abstracting (Rainer Lienhart, Silvia Pfeiffer, and Wolfgang Effelsberg. Video Abstracting, *Communications of the ACM*, pp. 55–62, December 1997.). MoCA Abstracting was explicitly designed to generate trailers of feature films. The system performs an extensive video analysis of a feature film to segment it into shots/scenes and to determine special events, such as text appearing in the title sequence, close-up shots of main actors, explosions, gunfire, etc. This information is used to select the clips for the video abstract. During the final assembly, ordering and editing rules are presented. The MoCA Abstracting highly relies on special events such as explosions, gunfire, shot/ reverse shot dialogs, and actions. Since such special events are usually not present in unscripted videos the MoCa system cannot be used to abstract unstructured material such as home videos.

A fourth abstracting system by Saarela and Merialdo does not perform any automatic content analysis (Janne Saarela and Bernand Merialdo. Using Content Models to Build Audio-Video Summaries. In *Storage and Retrieval for Image and Video Databases VII*, SPIE Vol. 3656, pp. 338–347, January 1999.). Instead, that system requires that videos have been annotated manually or automatically by descriptors for various properties and relations of audio and video segments. Based on those descriptors the system attempts to define "optimal" summaries.

A New System of Abstracting

Provided is a new method of abstracting multimedia information without requiring meta data such as transcripts. One embodiment abstracts unstructured information, such as home videos.

To abstract unstructured material such as home video, the abstracting system according to one embodiment is adapted to handle the specific features of unstructed video material. The following are typical differences between unstructured video and broadcast video material:

- Home video material is typically time-stamped data. Typically, analog and digital camcorders store the time and date of recording on the tape along with the video.
- Home videos typically document people's lives. Thus, there are typically no artificial story, plot or structure in the video material leading us to the hypothesis that all shots are more or less equally important. In comparison, feature films tell stories, have a plot and follow certain design rules. Most of films present several side stories around a main story. Thus, some shots/scenes are more important than others, suggesting that only the important shots be put into a video abstract of a feature film.
- The amount of home video material typically is not restricted. The total duration may easily sum up to hundreds of hours within a few years. As camcorders grow more and more popular, the size of home video archives grows rapidly.
- Home video typically consists of unedited, raw footage raising the demand to find reasonable cut-in and cut-out points to shorten individual shots. On the other hand, broadcast material is edited by professionals. As set forth earlier, previous video abstracting work made use of the knowledge of these professionals by selecting only complete shots as clips for a video abstract.
- Home videos are typically not shot for a general audience, but for friends, guests and oneself. Thus, the quality of abstracts can only be judged by the intended viewers, not by people having no relation of any kind to the contents of the home video.

One embodiment uses the visible time and date stamp available on many analog home video tapes. Specifically, the system extracts the timestamp from the video and uses this timestamp to identify the time and date when a particular video clip was captured. Digital video cameras typically present time stamp information that can be retrieved via the IEEE 1394 interface. Due to the consistent availability of timestamps in digital video, any sharp change in the time stamp may be used to detect cuts between shots.

Physical Implementation

Figure 1:
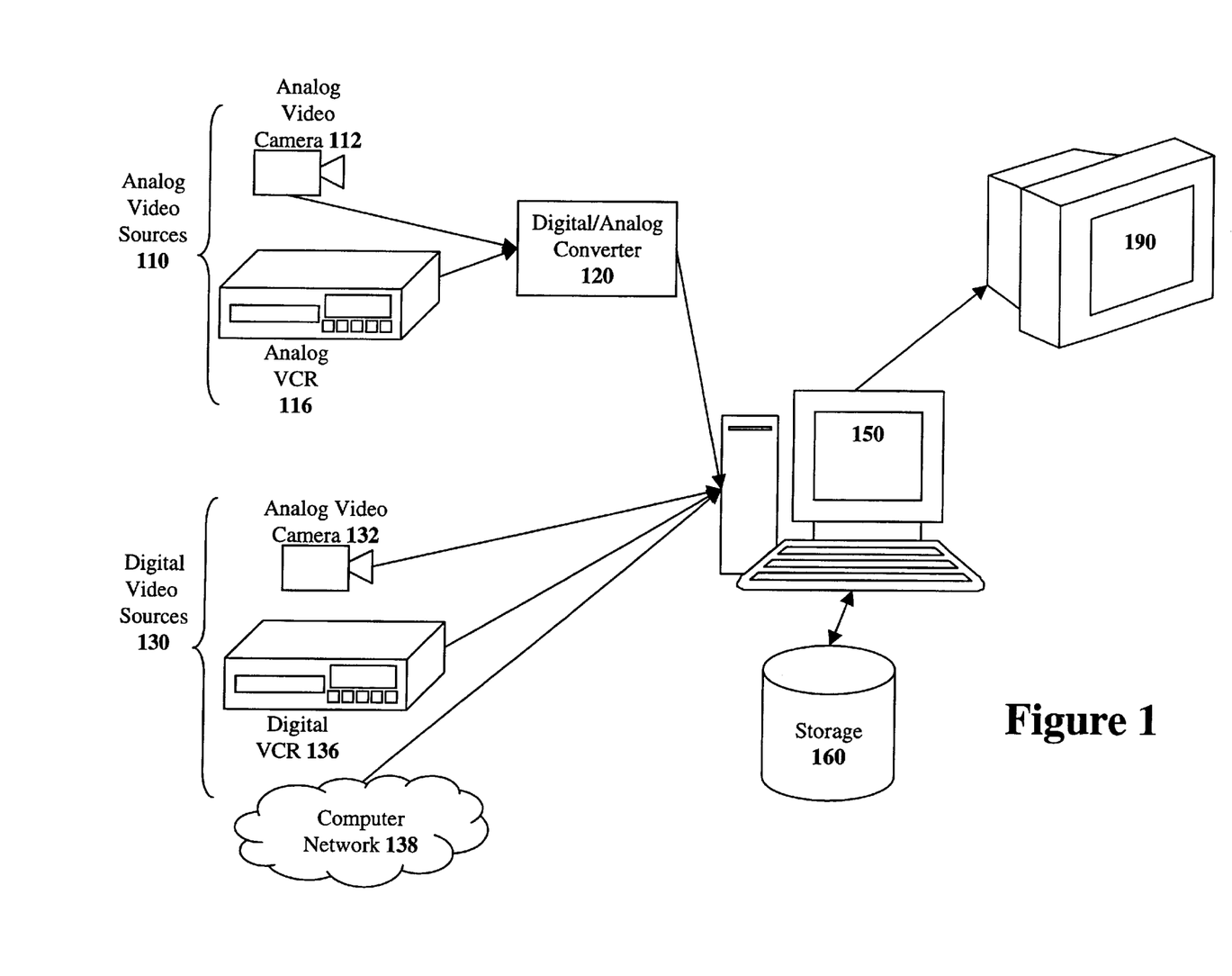
FIG. 1 illustrates a block diagram of one embodiment of an abstracting system.

FIG. 1 illustrates a block diagram of one embodiment of a computer-based automatic abstracting system. In the embodiment of FIG. 1, a computer system 150 acquires digital video from either analog video sources 110 or digital video sources 130. The analog video sources may include analog video cameras 112, analog videocassette recorders (VCR) 116, or any other analog video source. For analog video input sources 110, the analog video is digitized using an Analog to Digital (A/D) converter 120. The A/D converter 120 may be a stand-alone unit or housed within computer system 150. The digital video may be received directly through any digital interface into the computer system 150. Digital video sources include (but are not limited to) digital video cameras 132, digital videocassette recorders (VCR) 136, any digital video source accessed through a computer network 138, or any other analog video source.

The computer 150 receives the digital video, preprocesses the video, and stores the preprocessed video along with meta data into a storage system 160. In one embodiment, The storage system 160 may be a stand-alone unit (such as an external SCSI drive) or housed within computer system 150. To facilitate fast access to stored video, the storage system 160 may be a RAID (Redundant Array of Inexpensive Disks) storage system.

One embodiment of the system is implemented using the C++ and Intel Corporation's high performance MPEG and Signal Processing Library. The teachings of the present invention may be used with MPEG1 format, MPEG2 format, or other compressed (or uncompressed) digital video formats.

When a user requests a new video abstract, the meta data and the preprocessed digitized video are retrieved from the storage system 160 in to create a new video abstract. The computer system 150 automatically generates a video abstract by running a special automated video abstracting program. The video abstracting program analyzes the stored information with reference to the abstract input parameters to generate a video abstract. The computer system 150 then plays the automatically generated video abstract on a display device of the computer system 150 or on a television system 190.

Video Preprocessing

As set forth in the previous section, the input video information needs to be processed before an abstract may be created. Analog and digital video are processed using slightly different systems.

Analog Video Preprocessing

Figure 2:
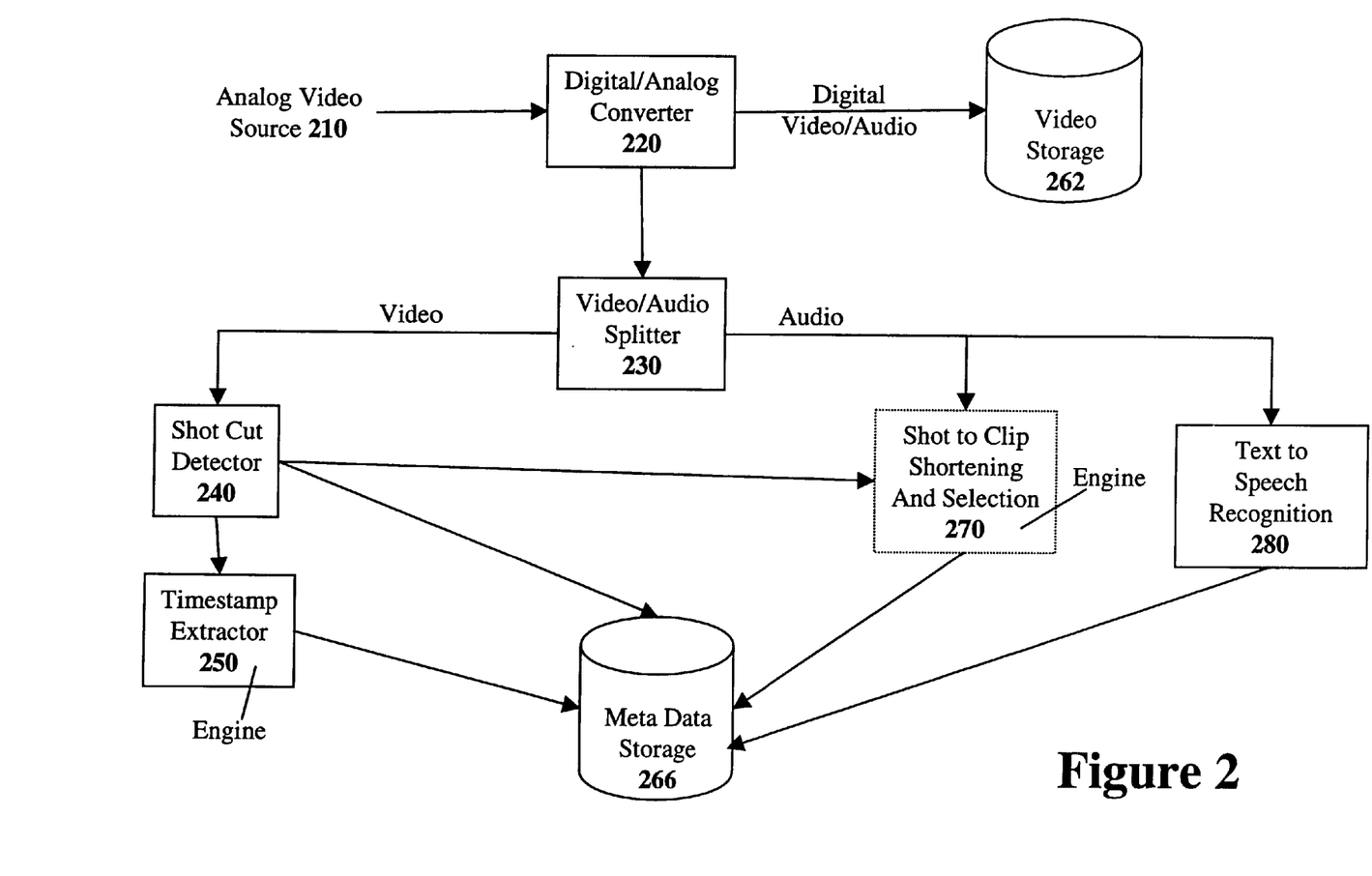
FIG. 2 illustrates a conceptual diagram for extracting meta data from analog video.

One embodiment processes video from analog sources to extract time and date meta information. The computer system 150 may perform the processing of the video from an analog source. The automatically extracted meta information is stored along with the digital video in the data storage. FIG. 2 illustrates the details of the processing of analog video input.

Referring to FIG. 2, a D/A converter 220 first converts the analog input video 210 into digital video and audio. The digital video and audio is stored into digital video storage system 262. The digital video/audio output is also passed to a video/audio splitter 230. The video/audio splitter 230 splits the digital video/audio into separate component video and audio streams. The separate component video and audio streams are further processed to extract meta data.

A shot cut detector unit 240 detects hard cuts in the video stream. Prior to the abstracting procedure, the shot cut detector unit 240 determines shot boundaries using a hard cut detection method. One method of hard cut detection that may be used is disclosed in the paper "Rapid Scene Analysis on Compressed Video" by B. -L. Yeo and B. Liu (*IEEE Transactions on Circuits and Systems for Video Technology*, Vol. 5, No. 6, December 1995.). The detected shot boundaries are stored in a meta data storage 266.

After the shot detector unit 240 has detected the various shot boundaries, a timestamnp extractor 250 assigns a timestamp to each shot. The timestamp extractor 250 extracts a times stamp from within the analog video. Most current analog camcorders allow the user to superimpose the time and date of recording on the video. The timestamp extractor 250 extracts a time stamp by recognizing the time and date of recording superimposed on the actual video feed.

Various algorithms for segmenting and recognizing text in videos are available. Typically, the reported average recognition performance is about 80%, i.e. on the average every fifth character is recognized incorrectly. For a typical time and date text of 15 characters the probability of no error is about 3.5%. Thus, the time and date of recording of 96.5% of all sources must be checked and corrected manually. This is a burdensome effort for a home video user.

Therefore, in one embodiment, the text segmentation and text recognition algorithms are adjusted to the specific characteristics of time and date information in home videos. For instance, the time and date text is typically static at a fixed location, and has a very simple structure such as "MM DD YYYY" or "HH:MM:SS", and uses a limited set of characters/digits. The latter feature is used to correct falsely recognized characters or fill-in missed characters and to judge whether the recognition is correct or needs manual revision. If the timestamp extractor fails to extract a satisfactory timestamp, the timestamp extractor 250 may ask the user to manually assign a timestamp. Once the timestamp information has been extracted, the timestamp extractor 250 stores the timestamp information for each shot in the meta data storage 266.

A shot shortening and selection engine 270 examines the audio track of each individual shot detected by the shot boundary detector 240. The shortening and selection engine 270 shortens the shot by attempting to select the important parts. Details on the shot to clip shortening and selection engine 270 will be explained in detail in a later section.

In one embodiment, an optional text to speech recognition system 280 may be used to extract textual information that is spoken into the audio track. This textual information may be used for selecting shots, subtitling shots, or introducing shots.

Digital Video Processing

Figure 3:
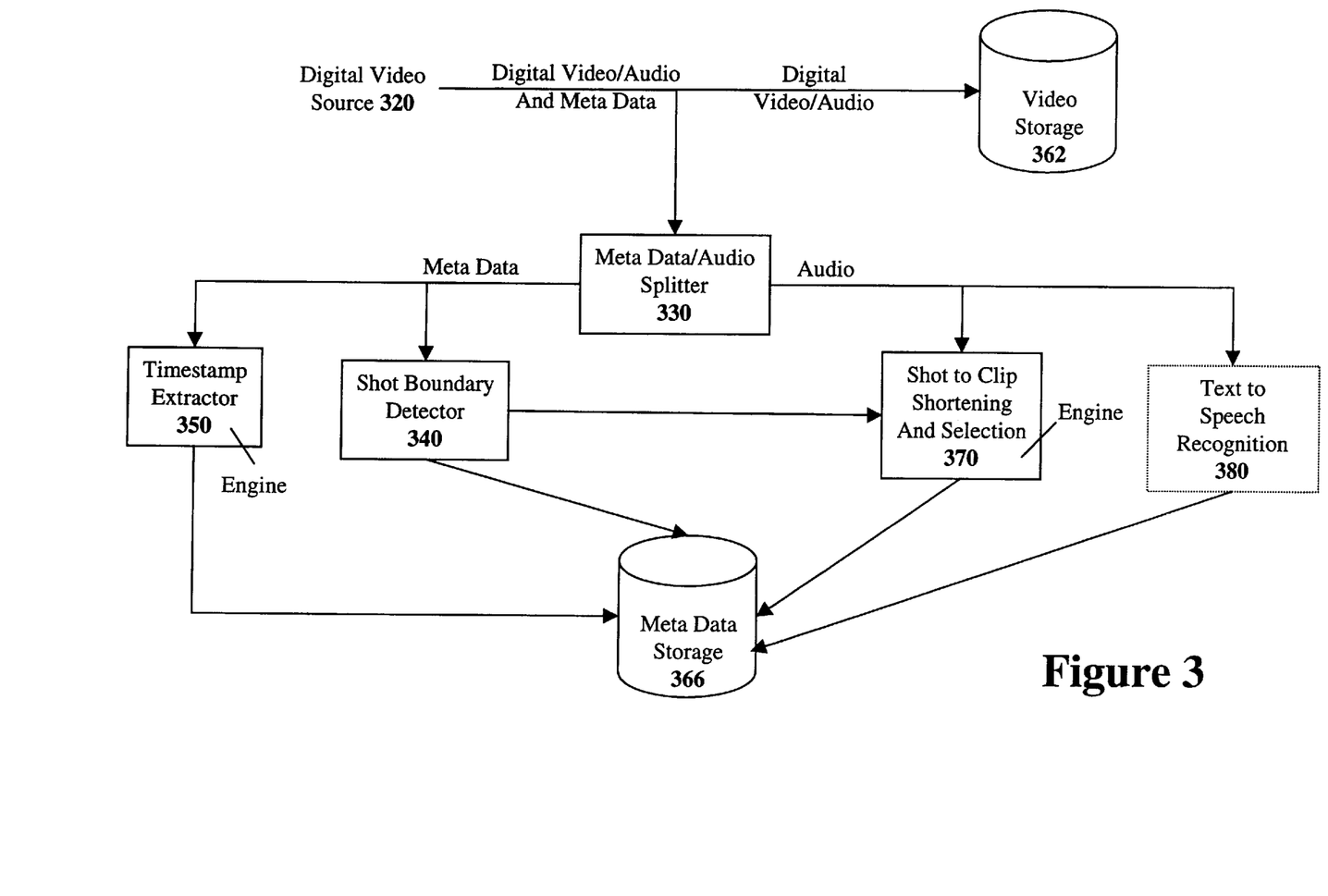
FIG. 3 illustrates a conceptual diagram for extracting meta data from digital video.

FIG. 3 illustrates the processing of digital video. The processing of digital video is similar to the analog video processing except that the digital originated video is easier to process due to extra meta data information such as digital timestamps. In the digital processing system of FIG. 3, a splitter 330 splits out the meta data information and the audio information.

A timestamp extractor 350 extracts timestamps for the video. The timestamps are typically encoded within the digital video. The timestamps are stored in the data of each frame. For example, a digital video frame typically consists of 10/12 DIF sequences for NTSC/PAL systems. A DIF sequence in turn typically consists of 150 blocks at a length of 80 bytes. The fourth DIF block holds the time and date of recording at byte position 13 to 22. The DIF sequence can be converted to a standard time and date format.

A shot boundary detector 340 determines the hard cuts between shots. The shot boundary detector 340 identifies nonlinear changes in the timestamp stream.

As in the analog processing system, the shot shortening and selection unit 370 shortens shots and selects within selected parameters. The following section describes shortening in detail. Finally, an optional text to speech recognition system 380 may be used to extract textual information from the audio track of the video.

During analog and/or digital video processing, the processed results are stored into video and meta data storage systems. Note that the same database, disk system, and/or file system may be used to store both video/audio and meta data information. Video abstracts are then generated from the processed video information that has been stored.

Shot to Clip Shortening

Typically, there is a large diversity in the duration of shots, within a video as well as across different videos. Some video shots may run only for a few seconds, while other shots may last more than 10 minutes. In order to keep video abstracts short, long video shots must be cut down to selected parts, called clips. The number of clips needed to cover a video shot generally correlates with the length of a shot. For example, a single video clip may be enough for a video shot that is one minute or less. However, more clips may be needed for longer shots. For example, three to five clips may be needed to represent a ten-minute video shot.

To shorten shots into sets of smaller clips, a shot shortening method reduces the length of all shots lasting more than two minutes down to about one clip for every two minutes of shot. Thus, in one embodiment, the number of clips needed for each shot is determined by the following formula:

$$NumberofClips = \max\left\{\left[\frac{(endtime - starttime)}{2\ \text{minutes}}\right] + 1\right\}$$

In one embodiment, the method may select one clip for video shots between zero and two minutes, two clips for video shots between two and four minutes, three clips for video shots between four and six minutes, and so on. In an alternative embodiment, the number of clips selected for each shot is chosen dynamically, dependent on the contents of the shot.

Clip Selection

Once the number of clips has been determined, a clip selection procedure determines the actual clips that are selected from a shot. In one embodiment, the clip selection procedures is guided by the observation that during important events or actions, the sound is mostly clearly audible over a longer period of time than is the case with less important content. In particular, important events or actions are neither characterized by single loud peaks nor by long quiet periods. This observation for home video contrasts with the characteristics of feature films, where important events such as cries, explosions and gunfire coincide with absolute loudness. In the case of home video, however, absolute loudness seems not to be a suitable feature to measure importance. On the other hand, silent episodes typically mark parts where the cameraman was waiting for something to happen or where an event is over.

Figure 4:
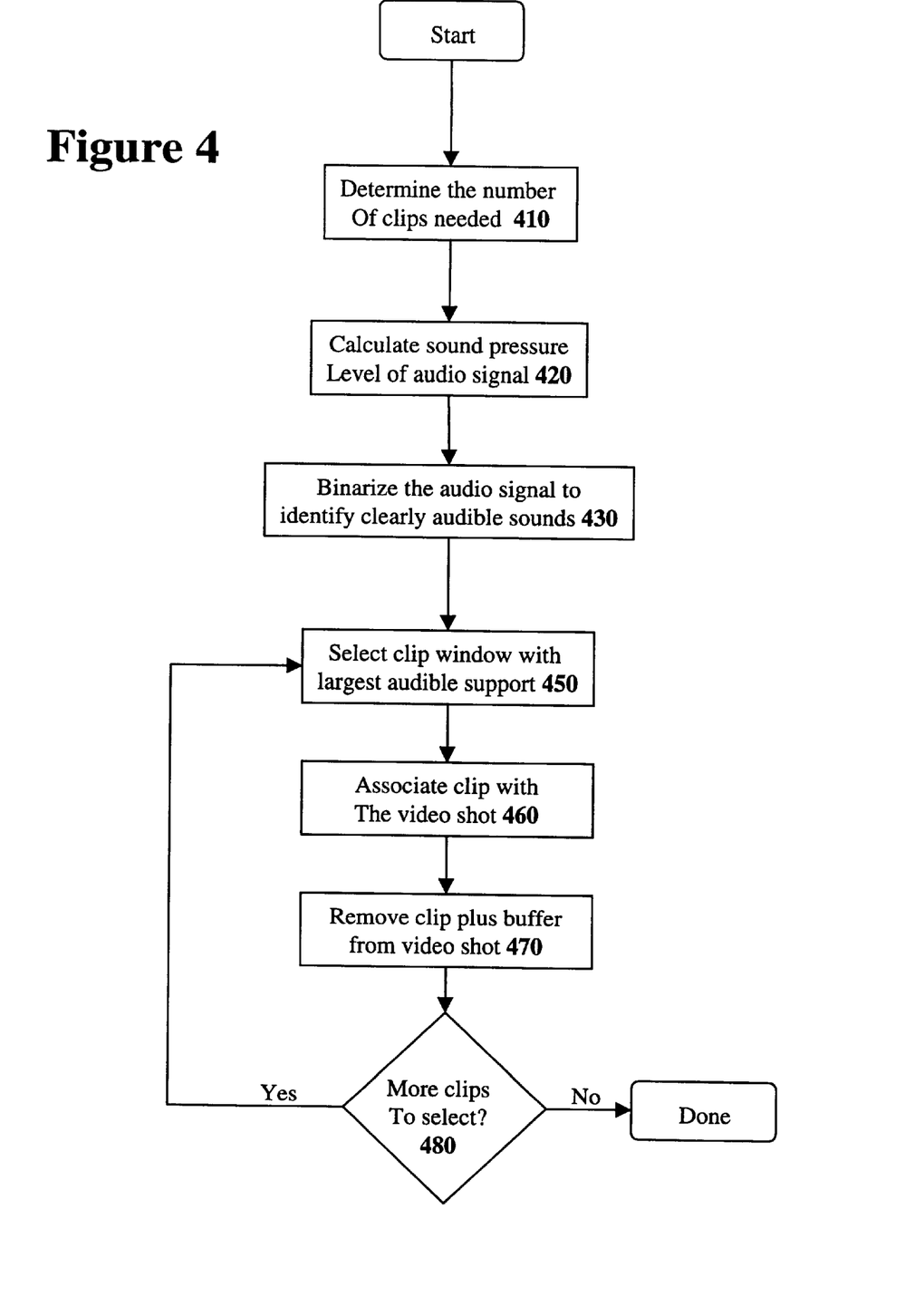
FIG. 4 illustrates a flow diagram describing a shot to clip shortening method.
Figure 5A:
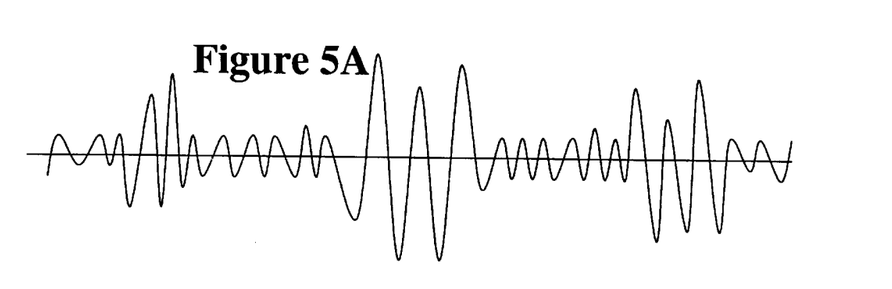
FIGS. 5A to 5D conceptually illustrate a shot to clip shortening.
Figure 5B:
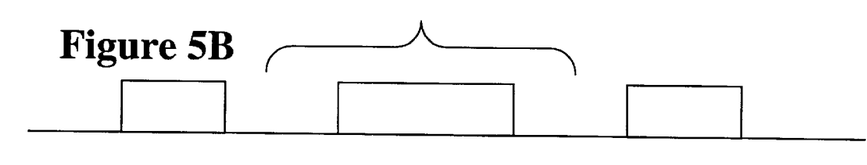

FIG. 4 illustrates one embodiment for a clip selection method. First, at step 410, the method determines the number of clips that must be extracted. Next, the method analyzes the audio track in step 420. In one embodiment, the sound pressure level of the entire shot is calculated. The method then performs a binary quantization of the audio track at step 430 to locate sections with clearly audible sound. In one embodiment, the method performs this by setting a threshold to the maximum of the 20% lowest sound pressure values in the shot. FIG. 5A conceptually illustrates a sound pressure level of an audio track. FIG. 5B conceptually illustrate how the audio track appears after it has been binary quantized.

The method then proceeds to select clips from the video shot. At step 450, the method selects a clip with the largest support over a window of N seconds of clearly audible sound as a selected part of a shot. In one embodiment, N was set to eight seconds. In one embodiment, to make the transition to and from the chosen clip smoother, the clip may be extended at both ends by one second. Formally, Given a shot $S_i=[t_b^i,t_e^i]$ with $t_c^i-t_b^i>t_{ss}$: the clip is selected with the following equation:

$$Clip=[\max\{t_{sa}^i-1,t_b^i\} \min\{t_{sa}^i+t_{ss}-1,t_e^i\}]$$

Wherein $$t_{sa}^i = \max_j \left\{ \sum_{i=j}^{j+(t_{ss}-2)} BinarizedSoundPressureLevel(i), j \in [t_b^i, t_e^i - (t_{ss}-2)] \right\}$$

Figure 5C:
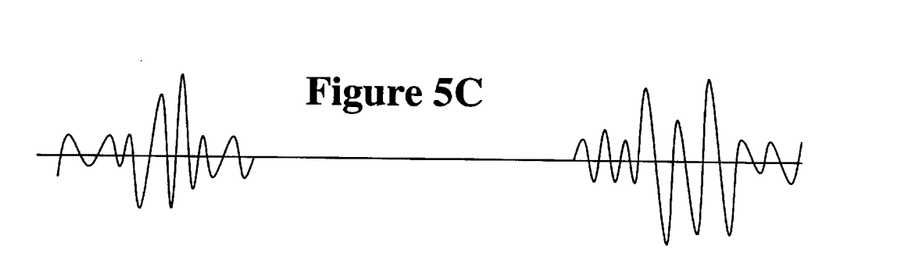
Figure 5D:
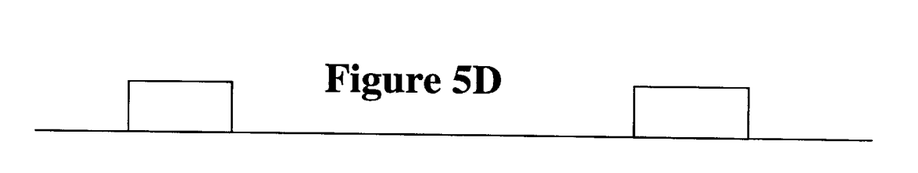

After selecting a clip, in step 460 the clip is added to the set of representative clips for that video shot. In step 470, the clip is then removed from the shot. In one embodiment, the clip is removed along with a buffer of thirty seconds of video before and after the shot. One method of "removing" the selected clip from the shot is to set the sound pressure of the selected shot plus the thirty-second buffer to zero. FIGS. 5C and 5D conceptually illustrate how the audio track and binary quantized audio track appear after a clip has been removed from the center of FIGS. 5C and 5D.

Multimedia Information Clustering

To abstract unstructured multimedia information, a multimedia clustering system is provided. The multimedia clustering system attempts to groups together related multimedia information using temporal locality. Specifically, multimedia information captured around the same time is gathered together into hierarchical temporal clusters. For example, in one embodiment individual contiguous "shots" of video captured within five minutes of each other are placed into the same "action" cluster. In a higher cluster, individual action clusters captured within an hour of each other placed into the same "event" cluster.

To create the multimedia clustering system, the time stamps of individual multimedia items are used. Thus, the timestamp meta data collected during video preprocessing can be used to cluster the shots.

In general, shot clustering denotes a process that groups together related shots into semantically richer entities. The grouped shots are commonly referred to as sequences, scenes, acts, video paragraphs, or story segments/units. In many existing shot clustering methods uses temporal distance plays an important role in clustering shots. However, all the existing shot clustering methods measure temporal distance by means of playback time or time code of the respective frames or shots. This time code is a relative time code that merely designates the edited order of the shots. The existing shot clustering algorithms exploit the editing pattern of a video to find scenes, whether to segment newscasts, sitcoms, sports or feature films. This editing structure is completely missing in raw video footage. A relative time ordering might be the appropriate choice for broadcasts such as feature films, commercials and sitcoms, since the actual time and date of recording are generally not related to the story. However, for any kind of raw film/video footage such as home video, the actual time and date of recording is much more desirable than the playback time.

A common measure for temporal distance between two video shots $S_i=[t_b^i,t_e^i]$ and $S_j=[t_b^j,t_e^j]$ is the time gap $\Delta t(S_i,S_j)$ between the two video shots. It is formally defined by $$\Delta t(S_i, S_j) = \begin{cases} 0 & \text{if } [t_b^i, t_e^i] \cap [t_b^j, t_e^j] \neq 0 \\ t_b^j, t_e^i & \text{if } (t_b^j > t_e^i) \\ t_b^i, t_e^j & \text{if } (t_b^i > t_e^j) \end{cases}$$

Where $t_b^i$ and $t_e^j$ denotes the time and date of the first and last frame of shot $S_j,S_i$ respectively.

Obviously, two contiguous shots recorded closely in time are very likely to show the same event, locale or action. Therefore, the basic idea is to put two shots into the same cluster if their temporal distance is below a threshold, i.e. $\Delta t(S_i,S_j)<$threshold. The problem of clustering shots based on time and date of recording thus reduces to the right choice of the threshold.

As the terms sequence, scene, act, video paragraph and story units do not have precise definitions we must identify the semantically richer entities we would like to extract. In one embodiment, five different types of shot clusters were defined:

1. Level 0 cluster—individual shots: Each shot represents its own level 0 cluster. Level 0 clusters are only introduced for convenience of the subsequent discussion.
2. Level 1 cluster—a sequence of contiguous "Actions": Actions are short-term events. A sequence of contiguous actions is a sequence of actions where one actions follows immediately another. The idea behind this so-alled level 1 action cluster is to group events of high causality. Strong causality can be assumed if the temporal distance between to contiguous shots is below a threshold value thresh,. On our video archives a value of thresh$_1$=5 minutes resulted in the desired semantic. Note, however, that the resulting clusters are not very sensitive to the choice of thresh$_1$. A value out the range of 5 to 10 minutes led to similar groupings. Generally, the content of the shots within a level 1 action cluster belong to the same locale or show related actions since one cannot travel very far within 5 minutes. Note, however, that the same locale/related actions may be distributed over several level 1 action clusters.
3. Level 2 cluster—a sequence of contiguous "activities": Activities last longer than actions and usually cover several actions. A sequence of contiguous activities is detected similar to a sequence of contiguous actions except employing a higher threshold. The idea behind this level 2 activity cluster is to group events such as birthday parties, weddings, or playing outside in the snow. Thus, level 2 activity clusters represent locales and actions in a wider sense. In the tested video archives, a value of thresh$_2$ =1 hour resulted in the desired semantic. Note, however, that the resulting clusters are not very sensitive to the choice of thresh$_2$. Any value in the range of 1 to 2 hours led to similar groupings.

4. Level 3 clusters—individual "days": When people browse or search through raw video footage, the date of recording is one important piece of information. In the case of video abstracting it is also important for choosing the right transition between shots. In principle, the actual date value extracted from each shot should be sufficient to construct day clusters. However, in reality the case is a little more difficult. There are two special cases that must be taken into account.

Firstly, an event such as a new year party or wedding usually last over into the next day. Generally, an abstract should not split up the shots of the event into different day clusters. Therefore, such shots should be assigned to the preceding day cluster, following the how people perceive the event.

Secondly, people do not adjust the clock of their camcorders when traveling to different time zones. If, for instance, someone travels from Europe to the US west coast, recordings during the day will be assigned two different dates: Everything recorded after 3 pm will show the date of the next day due to the 9 hours time-shift. Therefore, clustering based on the actual date information may result in confusing level 3 clusters.

One embodiment groups "day" clusters also using a threshold value. The threshold value denotes the typical time for a night of rest that is inferred from the recording pattern. In one embodiment, the clustering system assumes that people usually sleep at least 6 hours per day. Thus, the level 3 day threshold value $thresh_3$ is set to 6 hours.

5. Level 4—individual "multi-day events": Sometimes consecutive days form multi-day events. Typical examples include vacations, long weekends, and holidays. Usually, a multi-day event can be identified by frequent recordings on successive days. Especially the number of days without any recordings between days with some recordings is small. In contrast, everyday life lacks video recordings. Using the test video archives, a value of $thresh_4=4$ days resulted in the desired semantic. Note that any value between 2 and 5 days led to similar groupings. The multi-day event cluster will group weekends and vacations while avoiding grouping consecutive weekends between normal workdays.

The test home video archives, which comprise 7 hours of MPEG home video over a period of 2 years, the generated clusters represent the associated semantics quite well. Note that appropriateness of the constructed clusters is best judged by a person who was present during recording. Only such individuals have the context knowledge to judge the appropriateness of the clusters without taking the audio-visual similarity at hand.

For some of the video sequences that were captured from an analog camcorder only the date of recording was visible in the video. In such cases only level 4, 3, and 0 clusters were constructed. Level 3 clusters were based on the date information.

Abstracting Multimedia Information

After the multimedia information has been assigned into hierarchical clusters, the present invention may apply an abstracting method that automatically creates abstracts of arbitrary length.

To create high quality abstracts, the present invention uses several different heuristics. The following rules have been used into one embodiment to obtain high quality results:

1. Balanced coverage: The video abstract should be composed of clips from all parts of the source video set.
2. Shortened shots: The duration of most unedited shots is too long for video abstracts. Moreover, the uncut presence of long shots in video abstracts endangers a balanced coverage of the source video material. Therefore, one embodiment of the present invention cuts down video shots exceeding a maximal length to select the most interesting parts.
3. Random Selection: Due to the unstructured nature of home video material, all shots are generally equally important. In addition, individual abstracts of the same source videos should vary each time in order to hold interest after multiple playbacks. Therefore, one embodiment of the present invention uses "controlled" random clip selection in the video abstracting procedure.
4. Focused Selection: If the abstraction ratio is high, and that is the common case, the abstracting algorithm should focus only on a random subset of all level 4 clusters and their corresponding level 3 clusters. Thus, a more detailed coverage on selected clusters is preferred over a totally balanced, but too short coverage.
5. Variable Editing Patterns: For each cluster in the abstract a specific editing pattern should be chosen out of a set of possible editing patterns.

Given the duration of a video abstract $l_{va}$ the length $l_r$ of the raw source video material, the length of the shortened source video material $l_s$, and the abstraction ratio $l_r/l_{va}$, three different cases have to be distinguished for clip selection. The three cases are illustrated in the flow diagram of FIG. 6.

Figure 6:
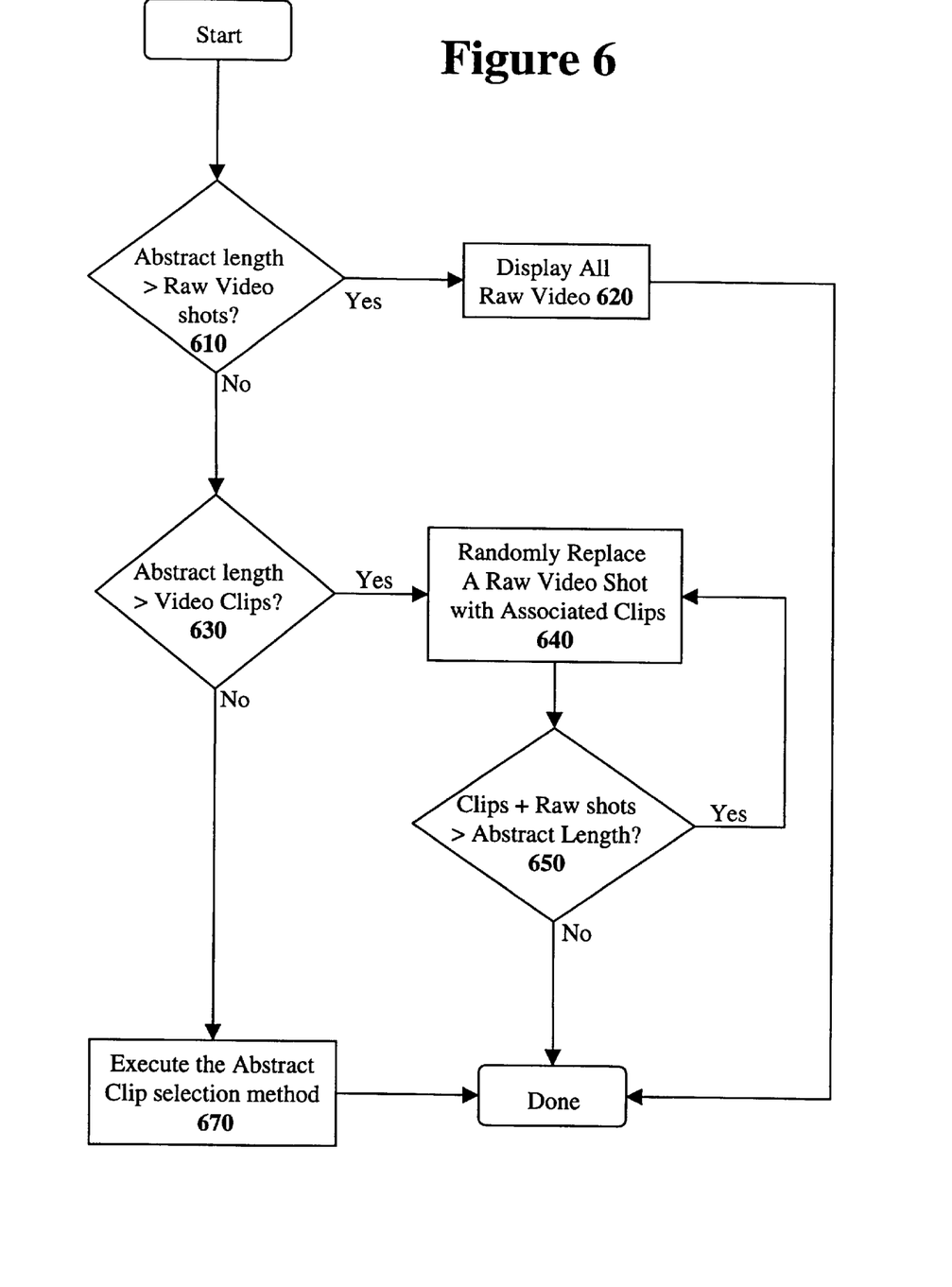
FIG. 6 illustrates a flow diagram describing an abstracting method.

Referring to FIG. 6 the first step 610 determines if the specified length of the video abstract exceeds the length of the raw source video material. In such a case, the automatic abstracting system simply displays all the raw source video material as specified in step 620.

At step 630, the abstracting program determines if the specified length of the video abstract exceeds the shortened source material (the sum length of all the clips). In such a case, the abstracting program begins with the raw video shots and then randomly replaces raw video shots with clips until the abstract meets the desired length. Specifically, the abstracting program replaces a randomly selected raw video shot with the associated shortened clips as set forth in step 640. Then, step 650 tests if the length of the revised video material meets the specified length of the video abstract. If the revised video material is not short enough, the method returns to step 640 to replace another raw video shot.

If the ratio $l_s/l_{va}>1$, then the abstracting program must begin with the shortened clips and reduce the number of clips until the desired abstract length is achieved. This should be the common case. The clip reduction method is illustrated in the flow diagram of FIG. 7.

Figure 7:
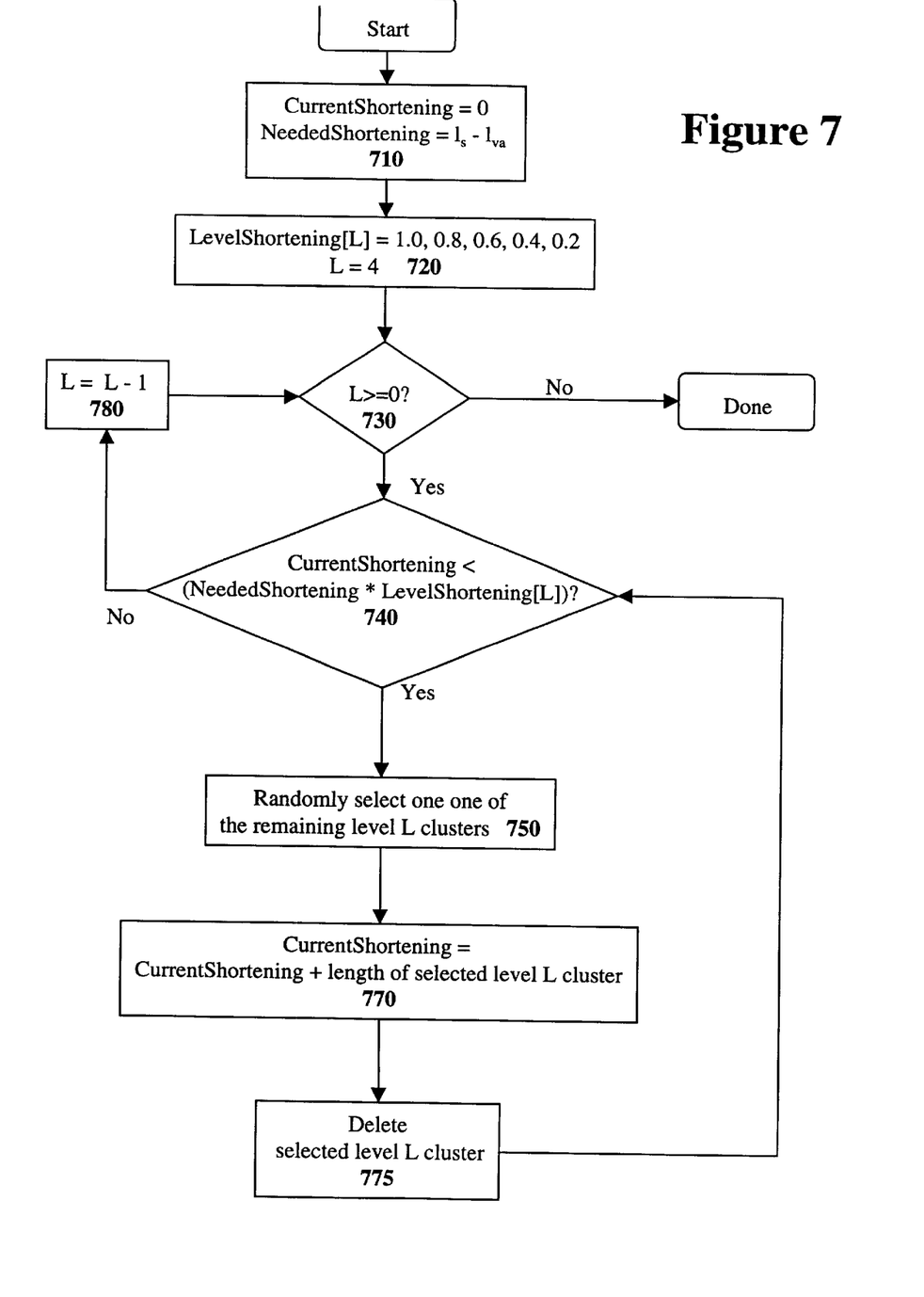
FIG. 7 illustrates a flow diagram describing an abstracting method that randomly eliminates video clips to shorten the video abstract.

Referring to FIG. 7, the method first initializes two variables that specify the needed shortening and the amount of current shortening done in step 710. Next, an array of level shortening values is created. In one embodiment, an equal 20% is deleted from each level. Thus, the first shortening iteration (level 4) should stop after having eliminated 20%. The next shortening iteration (level 3) should stop after having eliminated 40% (20% at this level plus the 20% from the previous level), and so on.

At step 730, the iterative procedure begins by testing if all levels have been reduced. At step 740, the method determines if the reduction of the current level has been completed. If not, the method selects one cluster from cluster level L at step 750. In one embodiment, the clips are selected randomly. However, other methods may be used to select a cluster to eliminate. After a cluster has been selected, the current shortened time value (CurrentShortening) is increased by the length of the selected level L cluster at step 770. The selected level L cluster is then removed from further consideration at step 775. The method returns to step 740 to determine if more shortening is required at the current cluster level.

The share needed from each cluster level to contribute to satisfying the target length of the video abstract was chosen empirically. In the embodiment of FIG. 7, the level 4, 3, 2, 1 and 0 clusters contribute each 20%. This clip selection method was compared against randomly chosen clips. The randomly chosen clips tended to have a larger coverage of the video content at the cost of showing only one shot for most events, giving a viewer the sense that the story line was missing. In contrast, the clip selection method of the present invention concentrated on randomly selected themes, covered the selected themes deeper, and thus gave a viewer the sense of some sort of a story line in the video abstract.

Clip Assembly

The present invention uses common editing cuts in a clip assembly stage to create a visually appealing video abstract. For home video, the composition basically comes down to choosing a sequence of visually appealing transitions between the clips. The temporal order of the clips is always preserved since it is integral to home video. Sequential occurrence is generally understood as temporal order.

Various types of transitions produce different associations. Thus, not all types of editing techniques are suitable to link all kinds of shots. One embodiment uses five sets of editing type. Each, each set specifying the set of edits allowed to link shots of different level 4, 3, 2, 1 and 0 clusters (see Table 1). For the video abstract, the type of editing is chosen randomly out of its appropriate set and kept fixed with the next higher cluster, i.e. the type of editing selected to link shots of different level n clusters is the same within its comprehensive level n+1 cluster. Each transition lasts 1 second, except for hard cuts and fades between different level 4 shots (see Table 1).

TABLE 1

List of editing types used to link shots at various levels

| Linkage between shots of different | Editing Types used | Edit Duration |
|---|---|---|
| Level 4 clusters | Fade in/out | 2 s |
| Level 3 clusters | Fade in/out | 1 s |
| Level 2 clusters | Center split, doors, pinwheel, all kind of irises | 1 s |
| Level 1 clusters | CheckerBoard, additive dissolve, paint splatter, all kinds of slides | 1 s |
| Level 0 clusters | Hard cut | 0 s |

The foregoing has described a method for automatically abstracting multimedia information. It is contemplated that changes and modifications may be made by one of ordinary skill in the art, to the materials and arrangements of elements of the present invention without departing from the scope of the invention.

We claim:

1. A method of generating an abstract of video data, said method comprising:
extracting timestamps from said video data, said timestamps identifying a time when separate sections of said video data were recorded;
selecting one or more separate continuous recording sections of said video data to generate said abstract of said video data, shot boundaries of separate continuous recording sections identified based on the recording sections having video clips with timestamps separated by less than or equal to a predetermined period of time.

2. The method of claim 1, wherein prior to selecting one or more sections of the video data, determining if a predetermined target length of the abstract is greater in length than said video data;
in response to the predetermined target length of the abstract being greater in length than said video data, selecting all of said video data as said abstract.

3. The method of claim 1 further comprising:
generating one or more clips for said separate continuous recording sections, said clips representing a subset of corresponding continuous recording sections.

4. The method of claim 3 wherein generating one or more clips includes selecting at least one subset of a first continuous recording section having a continuous audio signal equal to or greater than a predetermined level for a continuous period of time longer than separate subsets of said first recording section having a continuous audio signal equal to or greater than said predetermined level; and
removing said subset from said first continuous recording section of said video data.

5. The method of claim 4, further comprising:
prior to generating one or more clips, calculating a sound pressure level of said audio signal corresponding to said first continuous recording section.

6. The method of claim 5, further comprising:
after said calculating said sound pressure level, generating a binary representation of said audio signal corresponding to said first continuous recording section.

7. The method of claim 6, wherein said predetermined level is determined from said calculated sound pressure level of said audio signal.

8. The method of claim 4, wherein removing a selected clip includes removing a buffer section adjacent to said selected clip.

9. The method of claims 4, further comprising:
prior to generating one or more clips, determining a number of clips to be generated for said first recording section;
generating one or more clips for said first recording section until the determined number of clips are obtained.

10. The method of claim 4, wherein in response to the predetermined target length of the abstract being less in length than said video data, determining if the predetermined target length of the abstract is greater than or less than a sum of said video clips generated from said video data;
in response to the predetermined target length of the abstract begin less than the sum of video clip, selecting video clips of said video data separated by less than or equal to said predetermined period of time to generate said abstract of said video data.

11. The method of claim 10, wherein in response to the predetermined target length of the abstract being greater than a sum of said video clips generated from said video data, selecting all video clips generated from said video data.

12. The method of claim 11, wherein the method of generating an abstract of said video data is performed dynamically as video data is being recorded.

13. The method of claim 11, wherein the predetermined period of time is selected from a group consisting of at least 5 minutes, at least one hour, or at least six hours.

14. A machine-readable medium representing a set of instructions for abstracting video data, which when executed by processor, cause said processor to perform a method comprising:

extracting timestamps from said video data, said timestamps identifying a time when separate sections of said video data were recorded;

selecting one or more separate continuous recording sections of said video data to generate said abstract of said video data, shot boundaries of separate continuous recording sections identified based on the recording sections having video clips with timestamps separated by less than or equal to a predetermined period of time.

15. The machine-readable medium of claim 14, wherein prior to selecting one or more sections of the video data, determining if a predetermined target length of the abstract is greater in length than said video data;

in response to the predetermined target length of the abstract being greater in length than said video data, selecting all of said video data as said abstract.

16. The machine-readable medium of claim 14 including additional instructions, which when executed by a processor, cause said processor to perform:

generating one or more clips for said separate continuous recording sections, said clips representing a subset of corresponding continuous recording sections.

17. The machine-readable medium of claim 16 wherein generating one or more clips includes selecting at least one subset of a first continuous recording section having a continuous audio signal equal to or greater than a predetermined level for a continuous period of time longer than separate subsets of said first recording section having a continuous audio signal equal to or greater than said predetermined level; and removing said subset from said first continuous recording section of said video data.

18. The machine-readable medium of claim 17, including additional instructions, which when executed by a processor, cause said processor to perform:

prior to generating one or more clips, calculating a sound pressure level of said audio signal corresponding to said first continuous recording section.

19. The machine-readable medium of claim 18, including additional instructions, which when executed by a processor, cause said processor to perform:

after said calculating said sound pressure level, generating a binary representation of said audio signal corresponding to said first continuous recording section.

20. The machine-readable medium of claim 19, wherein said predetermined level is determined from said calculated sound pressure level of said audio signal.

21. The machine-readable medium of claim 17, wherein removing a selected clip includes removing a buffer section adjacent to said selected clip.

22. The machine-readable medium of claim 17, including additional instructions, which when executed by a processor, cause said processor to perform:

prior to generating one or more clips, determining a number of clips to be generated for said first recording section;

generating one or more clips for said first recording section until the determined number of clips are obtained.

23. The machine-readable medium of claim 17, wherein in response to the predetermined target length of the abstract being less in length than said video data, determining if the predetermined target length of the abstract is greater than or less than a sum of said video clips generated from said video data;

in response to the predetermined target length of the abstract begin less than the sum of video clip, selecting video clips of said video data separated by less than or equal to said predetermined period of time to generate said abstract of said video data.

24. The machine-readable medium of claim 23, wherein in response to the predetermined target length of the abstract being greater than a sum of said video clips generated from said video data, selecting all video clips generated from said video data.

25. The machine-readable medium of claim 24, wherein generating an abstract of said video data is performed dynamically as video data is being recorded.

26. The machine-readable medium of claim 25, wherein the predetermined period of time is selected from a group consisting of at least 5 minutes, at least one hour, or at least six hours.

27. A computer system comprising:

a timestamp extractor to extract timestamps from video data, said timestamps identify a time when separate sections of said video data were recorded;

a selection engine to select one or more separate continuous recording sections of said video data to generate an abstract of said video data, shot boundaries of separate continuous recording sections identified based on the recording sections having video clips with timestamps separated by less than or equal to a predetermined period of time.

28. The computer system of claim 27, wherein prior to selecting one or more sections of the video data, said selection engine determines if a predetermined target length of the abstract is greater in length than said video data;

in response to the predetermined target length of the abstract being greater in length than said video data, said selection engine selects all of said video data as said abstract.

29. The computer system of claim 27, wherein said selection engine further generates one or more clips for said separate continuous recording sections, said clips representing a subset of corresponding continuous recording sections.

30. The computer system of claim 29 wherein said selection engine generates said clips by selecting at least one subset of a first continuous recording section having a continuous audio signal equal to or greater than a predetermined level for a continuous period of time longer than separate subsets of said first recording section having a continuous audio signal equal to or greater than said predetermined level, and said selection engine removes said subset from said first continuous recording section of said video data.

31. The computer system of claim 30, wherein said selection engine calculates a sound pressure level of said audio signal corresponding to said first continuous recording section.

32. The computer system of claim 31, wherein said selection engine generates a binary representation of said audio signal corresponding to said first continuous recording section.

33. The computer system of claim 32, wherein said predetermined level is determined from said calculated sound pressure level of said audio signal.

34. The computer system of claim 30, wherein said selection engine remove selected clips and a buffer section adjacent to said selected clips.

35. The computer system of claim 30, wherein said selection engine determines a number of clips to be generated for said first recording section and generates clips for said first recording section until the determined number of clips are obtained.

36. The computer system of claim 31, wherein in response to the predetermined target length of the abstract being less in length than said video data, said selection engine determines if the predetermined target length of the abstract is greater than or less than a sum of said video clips generated from said video data; and     in response to the predetermined target length of the abstract begin less than the sum of video clip, said selection engine selects video clips of said video data separated by less than or equal to said predetermined period of time to generate said abstract of said video data.

37. The computer system of claim 36, wherein in response to the predetermined target length of the abstract being greater than a sum of said video clips generated from said video data, said selection engine selects all video clips generated from said video data.

38. The computer system of claim 37, wherein the computer system of generates said abstract of said video data dynamically as video data is being recorded.

39. The computer system of claim 38, wherein the predetermined period of time is selected from a group consisting of at least 5 minutes, at least one hour, or at least six hours.

\* \* \* \* \*

UNITED STATES PATENT AND TRADEMARK OFFICE
CERTIFICATE OF CORRECTION

PATENT NO.    : 6,597,859 B1
DATED         : July 22, 2003
INVENTOR(S)   : Leinhart et al.

It is certified that error appears in the above-identified patent and that said Letters Patent is hereby corrected as shown below:

Column 8,
Lines 40 and 41, delete "so-alled", insert -- so-called --.
Line 44, delete "thresh,", insert -- $thresh_1$ --.

Signed and Sealed this

Seventh Day of October, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,597,859 B1
DATED : July 22, 2003
INVENTOR(S) : Lienhart et al.

It is certified that error appears in the above-identified patent and that said Letters Patent is hereby corrected as shown below:

<u>Title page,</u>
Item [75], Inventors, delete "Leinhart", insert -- Lienhart --.

Signed and Sealed this

Thirtieth Day of March, 2004

JON W. DUDAS
*Acting Director of the United States Patent and Trademark Office*